(12) United States Patent
Sealey

(10) Patent No.: US 11,070,660 B2
(45) Date of Patent: Jul. 20, 2021

(54) DATING METHOD

(71) Applicant: Richard Sealey, Niagara Falls (CA)

(72) Inventor: Richard Sealey, Niagara Falls (CA)

(*) Notice: Subject to any disclaimer, the term of this patent is extended or adjusted under 35 U.S.C. 154(b) by 0 days.

(21) Appl. No.: 16/593,427

(22) Filed: Oct. 4, 2019

(65) Prior Publication Data

US 2020/0112631 A1    Apr. 9, 2020

Related U.S. Application Data

(60) Provisional application No. 62/740,999, filed on Oct. 4, 2018.

(51) Int. Cl.
| | | |
|---|---|---|
| *H04M 1/72469* | (2021.01) | |
| *H04M 1/72457* | (2021.01) | |
| *H04W 4/21* | (2018.01) | |
| *H04W 4/02* | (2018.01) | |
| *H04M 3/42* | (2006.01) | |
| *G06F 3/0481* | (2013.01) | |
| *G06F 3/0482* | (2013.01) | |

(52) U.S. Cl.
CPC ...... *H04M 1/72457* (2021.01); *H04M 1/72469* (2021.01); *H04M 3/42374* (2013.01); *H04W 4/023* (2013.01); *H04W 4/21* (2018.02); *G06F 3/0482* (2013.01); *G06F 3/04817* (2013.01); *H04M 2201/42* (2013.01)

(58) Field of Classification Search
CPC .......... H04W 4/21; H04W 4/023; H04B 5/00; H04B 5/0025; G06F 3/0481
See application file for complete search history.

(56) References Cited

U.S. PATENT DOCUMENTS

| | | | | |
|---|---|---|---|---|
| 2009/0211136 A1* | 8/2009 | O'Connor | ............ | G09F 7/00 40/633 |
| 2015/0171926 A1* | 6/2015 | Coelho | ............ | H04B 5/0025 455/41.2 |
| 2015/0220777 A1* | 8/2015 | Kauffmann | ........ | G06K 9/00362 382/103 |
| 2016/0078787 A1* | 3/2016 | Canchola | ............ | G09F 3/005 40/633 |
| 2016/0162914 A1* | 6/2016 | Hornik | ............ | G06Q 30/0203 705/7.32 |
| 2016/0210602 A1* | 7/2016 | Siddique | ............ | G06Q 20/0453 |

FOREIGN PATENT DOCUMENTS

GB          2339950 A    *    2/2000    ............... B60Q 1/52

* cited by examiner

*Primary Examiner* — Jinsong Hu
*Assistant Examiner* — Farideh Madani
(74) *Attorney, Agent, or Firm* — Orin Del Vecchio

(57) ABSTRACT

A system for facilitating dating amongst a community of persons includes a notification system by which members of the community can make their participation in the community apparent to other compatible members of the community when in physical proximity to one another. A recording system is provided by which each member of a community can, in respect of compatible members in the community to whom they have had proximity, make it known that a contact would be welcomed. A communication system is also provided which facilitates a communication between members of the community who have made it known to the recording system that they would each welcome contact with the other.

6 Claims, 8 Drawing Sheets

DATING METHOD

FIELD OF THE INVENTION

The invention relates to the field of dating.

BACKGROUND

Many people are lonely. Society has a significant need for tools and methods that combat this problem.

SUMMARY OF THE INVENTION

Forming one aspect of the invention is a system for facilitating dating amongst a community of persons, the system comprising:
 a notification system by which members of the community can make their participation in the community apparent to other compatible members of the community when in proximity to one another;
 a recording system by which each member of a community can, in respect of compatible members in the community to whom they have had proximity, make it known that a contact would be welcomed;
 a communication system which facilitates a communication between members of the community who have made it known to the recording system that they would each welcome contact.

According to another aspect, the notification system can comprise signage such that each member can make their participation in the community apparent to other members of the community by making the signage visible.

According to another aspect, the signage can comprise stickers.

According to another aspect, the signage can comprise flags.

According to another aspect, the signage can include a system of color coding such that the sexual preferences of a member can be made known by making signage of a predefined color visible.

According to another aspect, the notification system can include a unique number assigned to each member and which appears on the signage for said each member.

According to another aspect, the recording system can be defined by a software application.

According to another aspect, the software application can be further adapted to receive profile information from members and to allow members that have been in proximity to one another to view the profile information of one another.

According to another aspect, the recording system can be adapted such that a member can make it known that contact with another member would be welcomed by placing a telephone call and dialing or speaking the unique number assigned to that other member.

DETAILED DESCRIPTION

Figure 1:
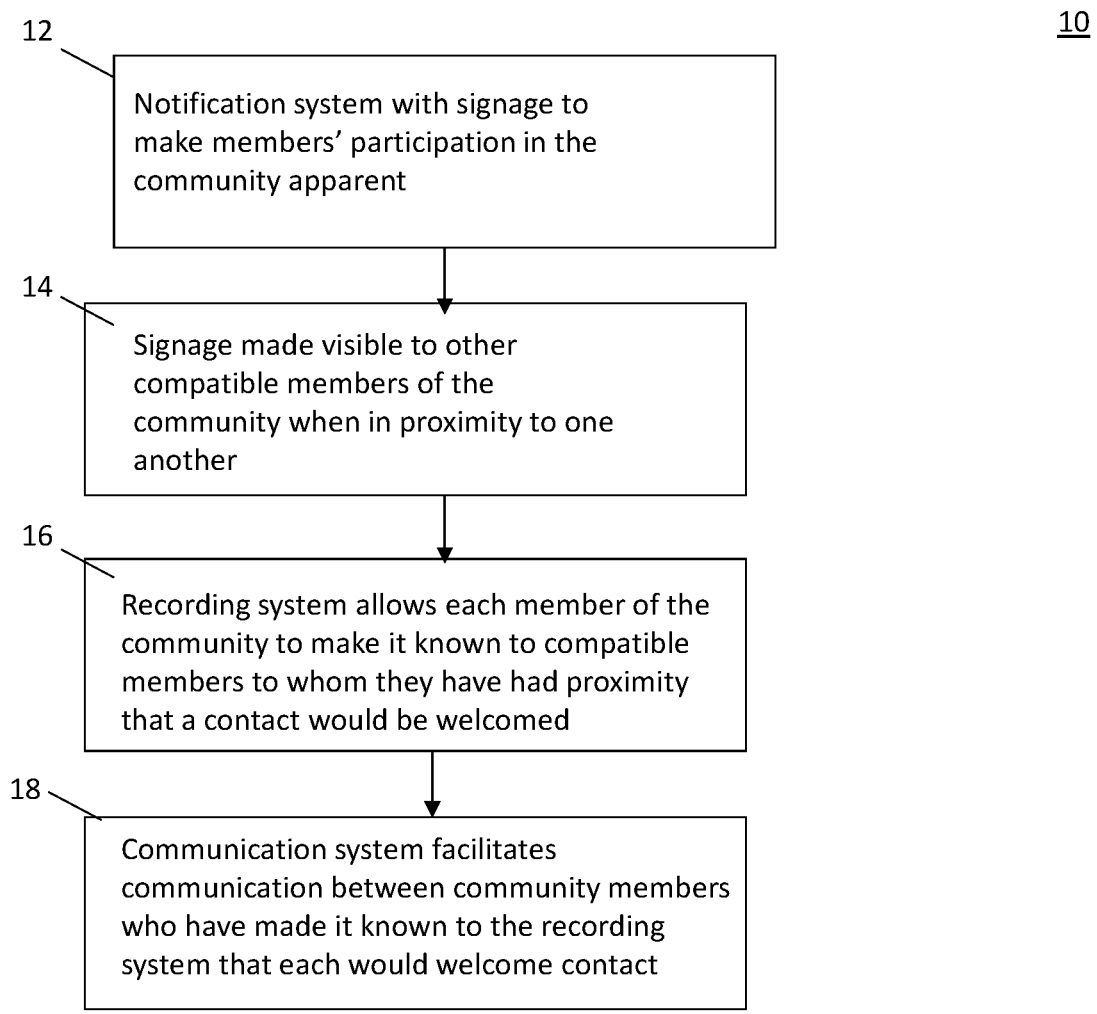
FIG. 1 is a flowchart of a method using the dating system according to an embodiment of the invention.

Referring to the figures, FIG. 1 illustrates a flowchart of a method using a system according to embodiments of the invention. The system is shown generally and 10 and comprises a notification system 12, a recording system 16 and a communication system 18.

Figure 2A:
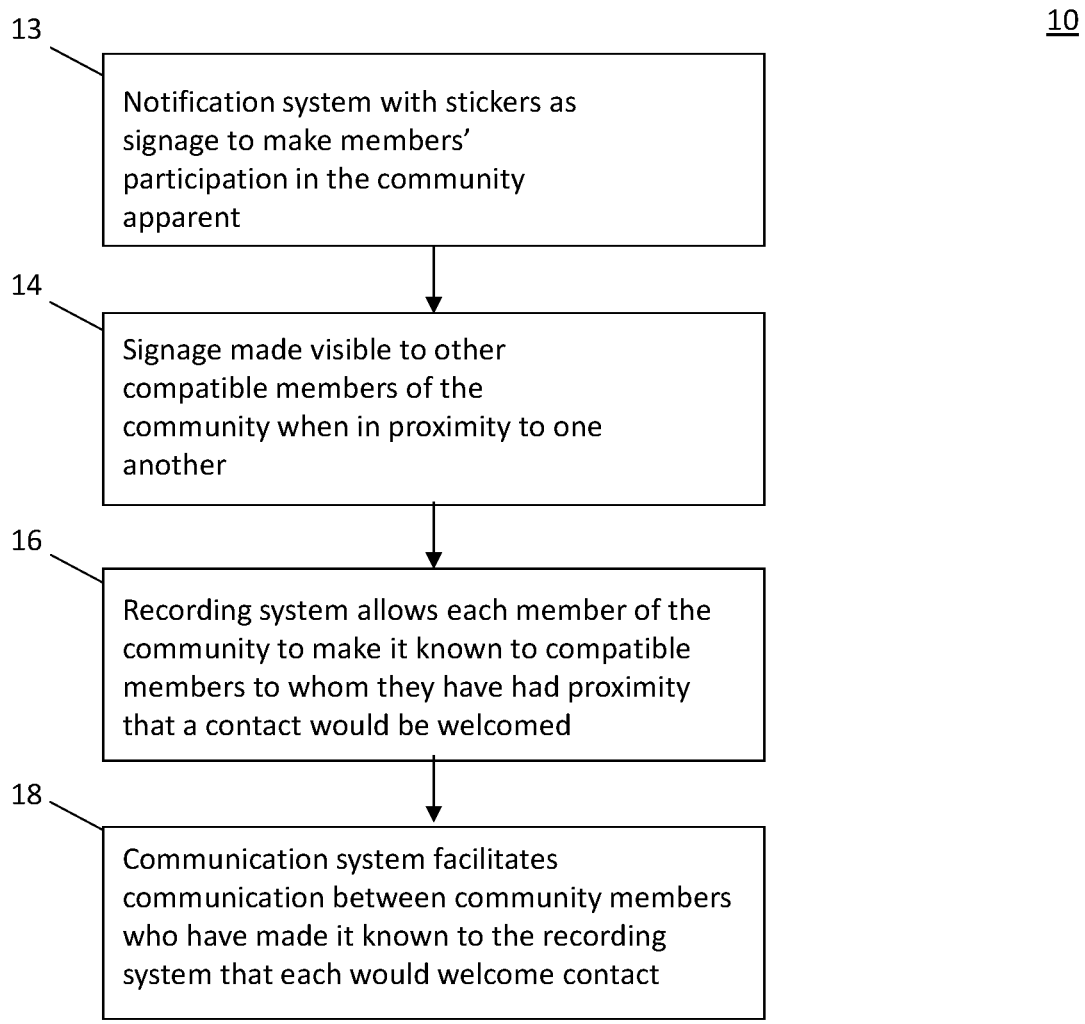
FIGS. 2A-2C are flowcharts of a method of using the dating system with various signage according to embodiments of the invention.
Figure 2B:
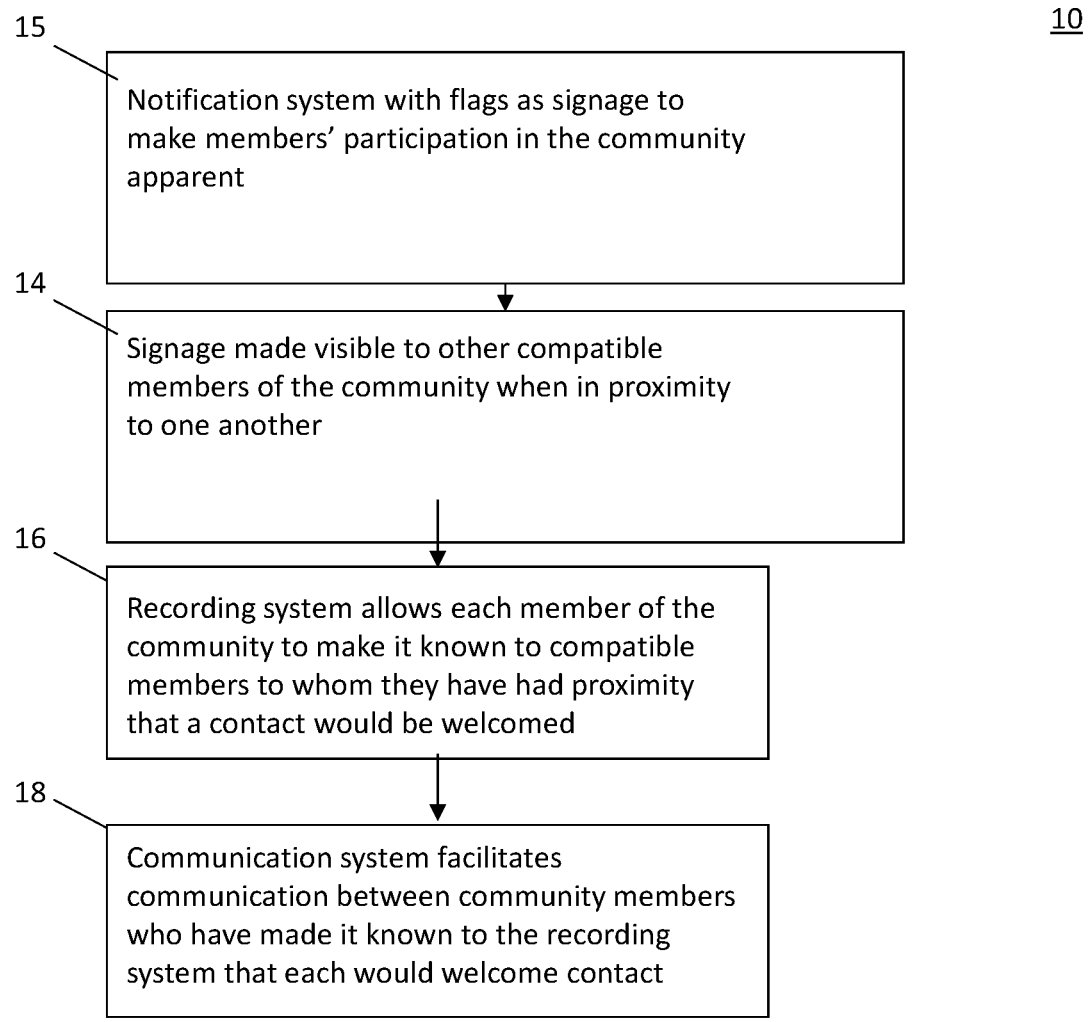
Figure 2C:
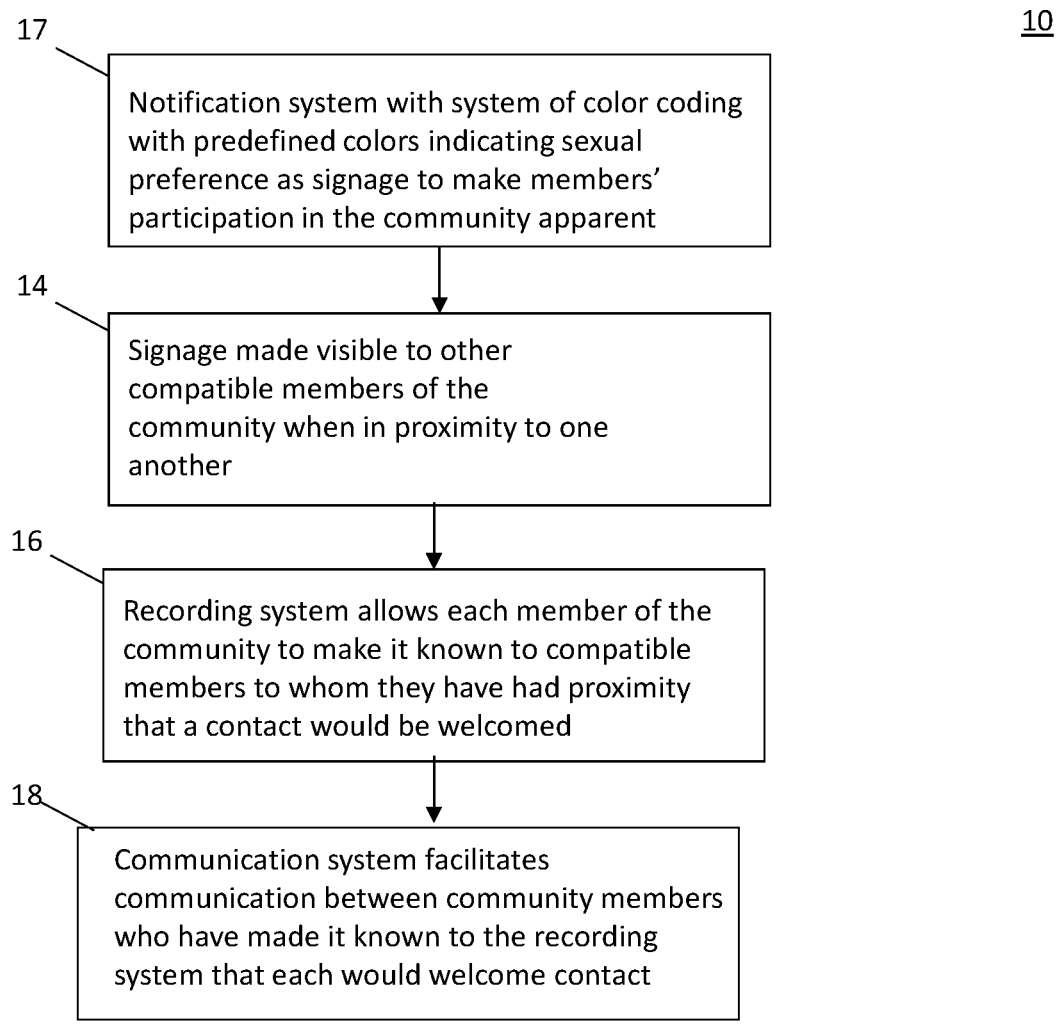
Figure 3A:
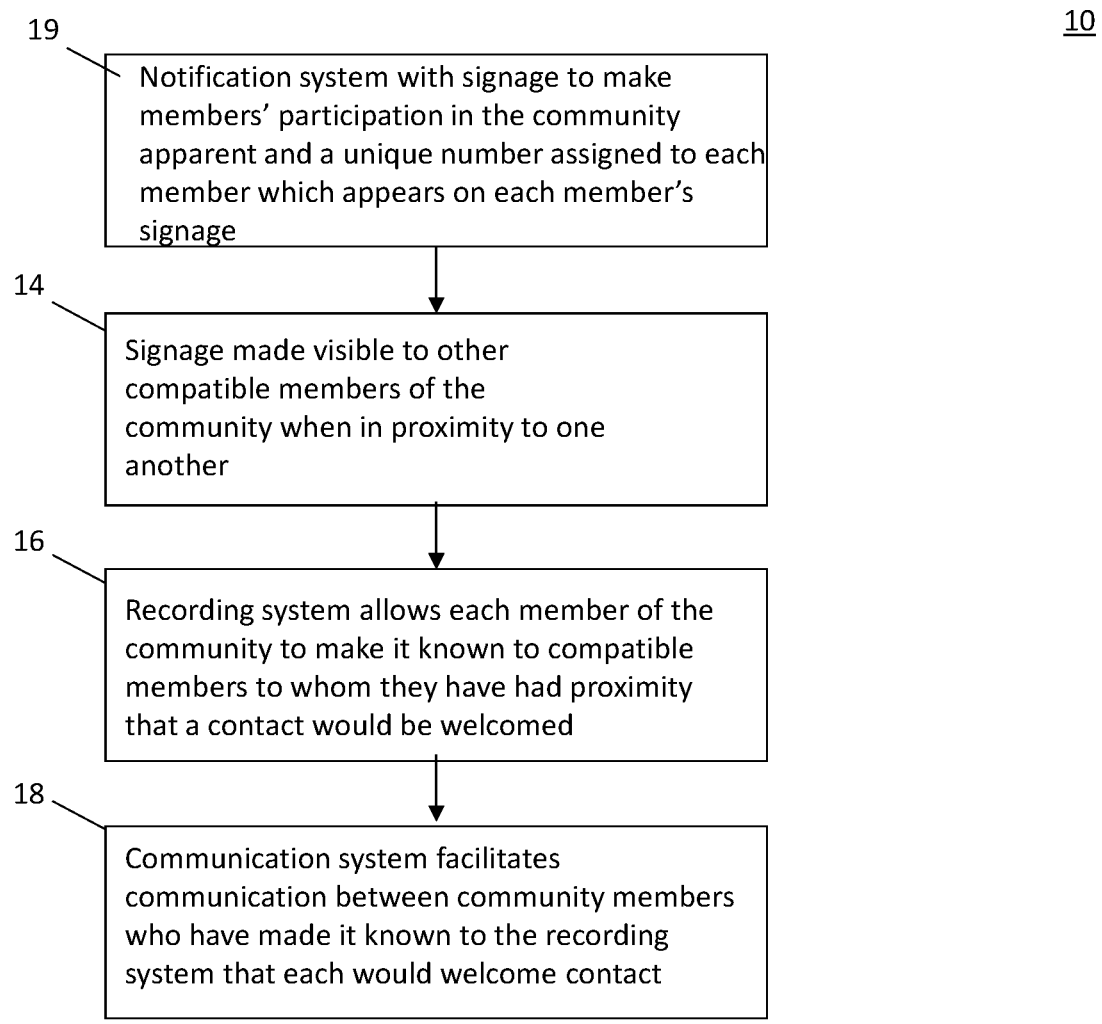
FIGS. 3A-3B are flowcharts of a method of using the dating system with a unique number assigned to each member's signage according to embodiments of the invention.

The notification system 12 allows members of a community to make their participation in the community apparent to other compatible members of the community when in proximity to one another and in some inventive embodiments comprises signage 14 illustratively including flags 15 and stickers 13, as shown in FIGS. 2B and 2A, respectively. The flags 15 bear a logo which indicates membership in the community. The stickers 13 each bear a number that is unique 19 to the member as shown in FIG. 3A. As shown in FIG. 2C, in some inventive embodiments, signage includes a system of color coding with predefined colors indicating sexual preference 17. Guys seeking girls will get blue flags; girls seeking guys get pink flags; LGBT get rainbow colored flags. The flag gets hung from the antenna of the vehicle of the member and the stickers are applied to the windows of the vehicle.

Figure 3B:
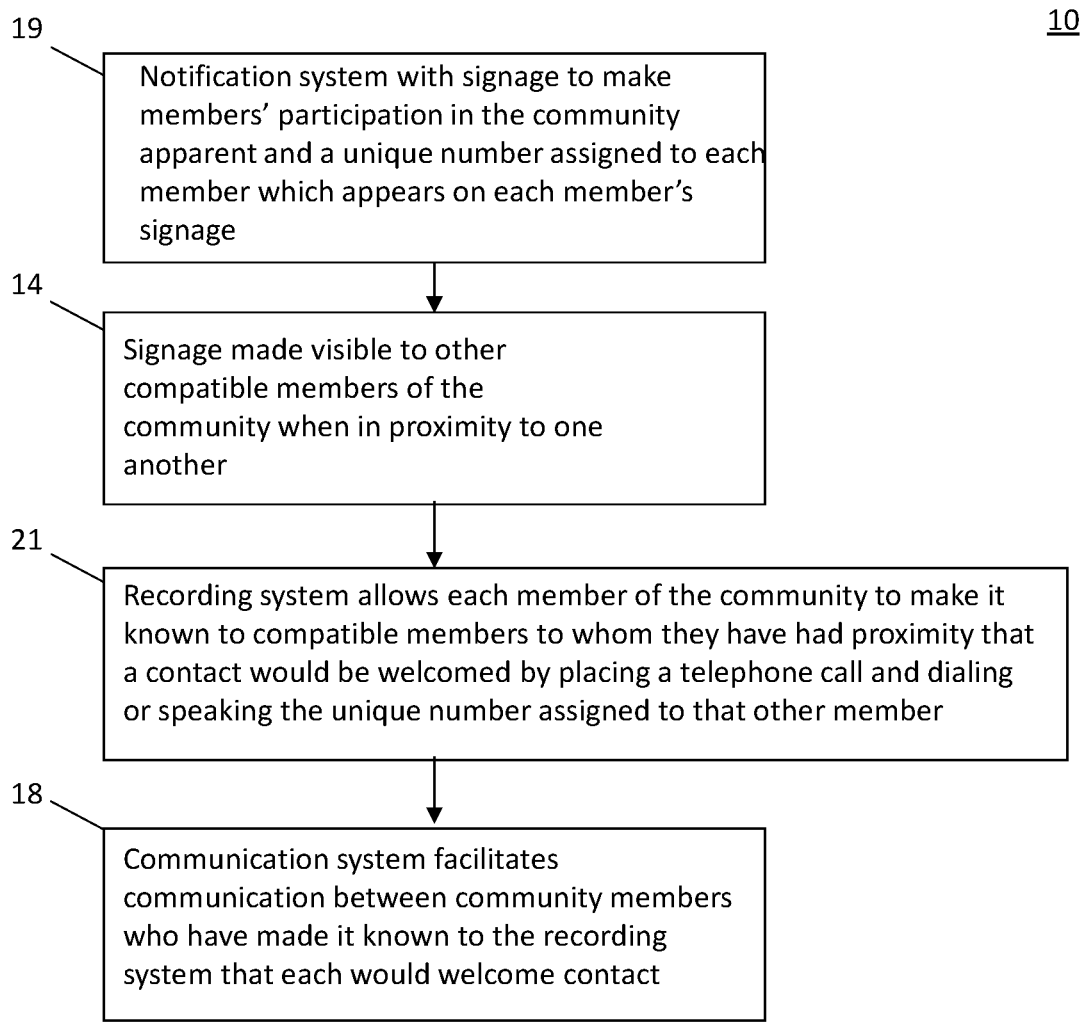
Figure 4A:
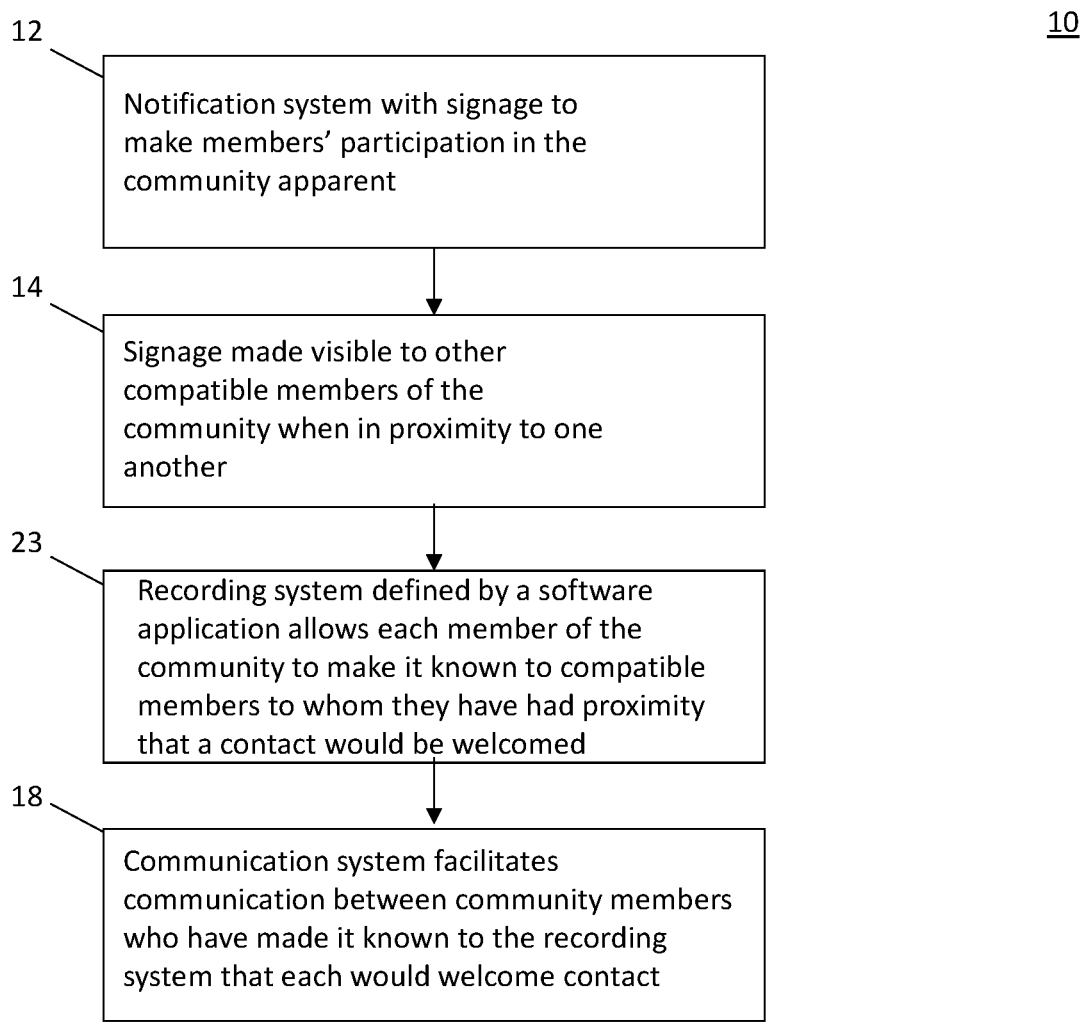
FIGS. 4A-4B are flowcharts of a method of using the dating system with a recording system defined by a software application according to embodiments of the invention.
Figure 4B:
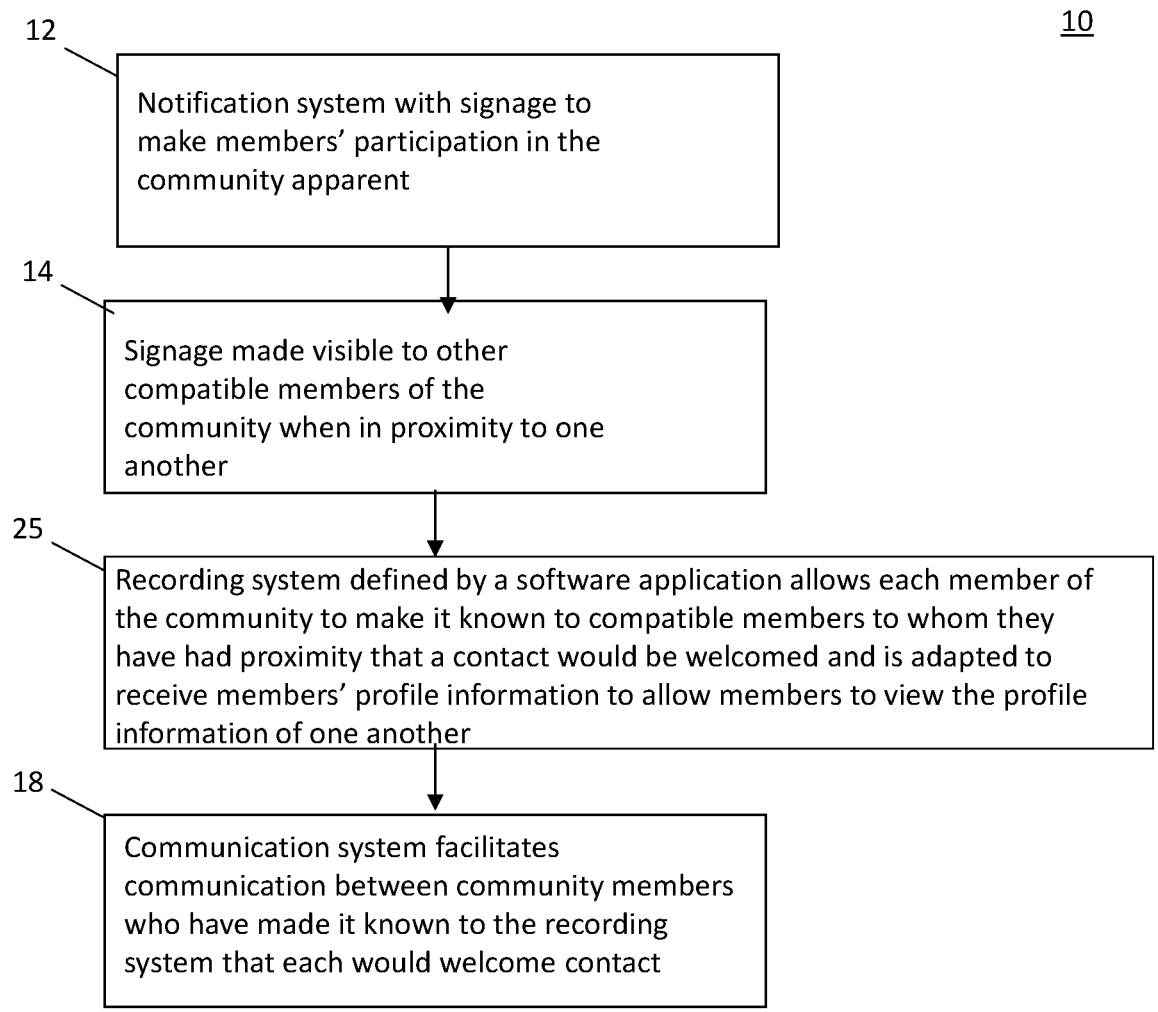

As shown in FIG. 4A, the recording system allows each member of a community to, in respect of compatible members in the community to whom they have or have had proximity, make it known that a contact would be welcomed 16. In this embodiment, the recording system is defined by a software application 23. The app shows a map displaying the current location of the member, icons representing members that are compatible with the member and in close proximity and have a current interest in dating and icons of members that that have been proximal to the member within a predetermined recent period, such as 12 hours and have a current interest in dating. As shown in FIG. 3B, each icon bears the unique number of a member 19. [Any member that is currently not interested in dating may signify as much to the recording system which will make that member invisible on the app, and render the icons of other compatible members also invisible.] As shown in FIG. 4B, clicking an icon displayed on the map will display some other basic information about the member such as, interested in, age, etc 25.

Also visible will be a honk button which, is selected, enables a member to honk at another member to signify interest.

As shown in FIG. 1, the communication system facilitates a communication between members of the community who have made it known to the recording system that they would each welcome contact 18. To wit, if members honk at each other, the system will allow members to communicate with one another. The system will include buttons to permit the delivery of prewritten messages such as "how are you", "coffee for two", "netflix n chill?" etc.

In another embodiment, as shown in FIG. 3B, the recording system is adapted such that a member can make it known that contact with another member would be welcomed by placing a telephone call to an 800 number and dialing or speaking the unique number assigned to that other member 21. If members have each called in about one another, the system will recognize that there is a match and will call each member back to provide basic contact information provided during sign up to each of the members so they can contact each other.

Whereas two embodiments have been described, variations are possible.

For example, the signage could include t-shirts bearing the logo and the member number.

As well, the signage could be made a single color, and the app could be modified to allow users to privately identify sexual preference and only render icons of compatible members visible on the map.

Further, the signage could be avoided altogether and the app could be modified to notify a member which a compatible member is nearby, based upon the proximity of the phones of the members, by vibrating or flashing a photograph of the member.

Accordingly, the invention should be understood to be limited only by the accompanying claims, purposively construed.

The invention claimed is:

1. A system for facilitating dating amongst a community of persons, the system comprising:
   a notification system having signage by which members of the community can make their participation in the community apparent by making the signage visible to other compatible members of the community when in proximity to one another, the signage comprising stickers, including a system of color coding such that a sexual preference of a member can be made known by making the signage a predefined color, and flags including the system of color coding such that a sexual preference of a member can be made known by making the signage a predefined color, the signage adapted to visibly applied to a vehicle associated with each of the members of the community;
   a mapping system by which members of the community can view their current location and icons displaying locations of other compatible members of the community, the icons further displaying sexual preference and a unique number for each other compatible member, the icons based on one or more of: current proximity, proximity within a predetermined time period, and a combination thereof;
   a recording system by which each member of a community can, in respect of compatible members in the community to whom they have had proximity, make it known that a contact would be welcomed; and
   a communication system which facilitates a communication between members of the community who have made it known to the recording system that they would each welcome contact.

2. The system of claim 1, wherein the notification system includes the unique number assigned to each member and which appears on the signage for said each member.

3. The system of claim 1, wherein the recording system is defined by a software application.

4. The system of claim 3, wherein the software application is further adapted to receive profile information from members and to allows members that have been in proximity to one another to view the profile information of one another.

5. The system of claim 2, wherein the recording system is adapted such that a member can make it known that contact with another member would be welcomed by placing a telephone call to a third party and dialing or speaking the unique number assigned to that other member.

6. The system of claim 1, wherein when a non-participating member has provided a notification to the recording system that the non-participating member does not welcome contact, the mapping system does not display an icon for the non-participating member.

* * * * *